United States Patent [19]

Ghisler et al.

[11] Patent Number: 5,539,807
[45] Date of Patent: Jul. 23, 1996

[54] SYSTEM AND METHOD FOR DIRECTING CALL CHARGES TO THIRD PARTIES

[75] Inventors: Walter Ghisler, Vasby; Ove Johansson, Kungsangen, both of Sweden

[73] Assignee: Telefonaktiebolaget LM Ericsson, Stockholm, Sweden

[21] Appl. No.: 523,759

[22] Filed: Sep. 5, 1995

Related U.S. Application Data

[63] Continuation of Ser. No. 376,528, Jan. 23, 1995, abandoned, which is a continuation of Ser. No. 19,689, Feb. 19, 1993, abandoned.

[30] Foreign Application Priority Data

Feb. 19, 1992 [SE] Sweden ................................ 9200490

[51] Int. Cl.$^6$ .................................................... H04Q 7/20
[52] U.S. Cl. .................................................. 379/58; 379/91
[58] Field of Search ................................... 379/58, 63, 91, 379/111, 112, 113, 114, 121, 123, 202, 205, 204, 144, 145, 456, 210, 211, 212, 356, 55, 66

[56] References Cited

U.S. PATENT DOCUMENTS

| | | | |
|---|---|---|---|
| 4,856,046 | 8/1989 | Streck et al. | 379/56 |
| 5,099,510 | 3/1992 | Blinken, Jr. et al. | 379/202 |
| 5,144,654 | 9/1992 | Kelly et al. | 379/356 |
| 5,222,123 | 6/1993 | Brown et al. | 379/58 |
| 5,241,410 | 8/1993 | Streck et al. | 379/55 |

FOREIGN PATENT DOCUMENTS

| | | |
|---|---|---|
| 0529721 | 3/1993 | European Pat. Off. . |
| 9316544 | 8/1993 | WIPO . |

OTHER PUBLICATIONS

M. Loosen, "The State of the Intelligent Network Art" *Telecommunications*, pp. 47–58 (Feb. 1988).
58–223952 Dec. 26, 1983 Japan (Abstract).
58–165473 Sep. 30, 1983 Japan (Abstract).

*Primary Examiner*—Curtis Kuntz
*Assistant Examiner*—Michael B. Chernoff
*Attorney, Agent, or Firm*—Burns, Doane, Swecker & Mathis

[57] ABSTRACT

A system and a method for enabling a subscriber with a radio terminal to use another terminal, which does not belong to his radio terminal subscription, includes an automatic network service enabling the subscriber to open a subscription to the service while storing information concerning the radio terminal subscription in the network. After having become a subscriber to the service the radio terminal subscriber may request use of the service by calling it via the radio terminal while entering the number of the other terminal as well as the number of a destination terminal. This results in the subscriber being able to communicate from the other terminal to the destination terminal. After use of the service a specified account is charged.

22 Claims, 3 Drawing Sheets

SYSTEM AND METHOD FOR DIRECTING CALL CHARGES TO THIRD PARTIES

This application is a continuation, of application Ser. No. 08/376,528, filed Jan. 23, 1995 now abandoned, which is continuation of application Ser. No. 08/019,689, filed Feb. 19, 1993, now abandoned.

BACKGROUND

Generally the invention relates to a method and a system enabling third party charge at the use of a terminal or a telephone in a telecommunication network.

More particularly, the subject invention relates to a method and a system enabling a subscriber with a radio terminal to use another terminal or telephone, which does not belong to his radio terminal subscription.

An example of such a subscriber is a telephone subscriber, who has a mobile telephone, and at the same time is a subscriber in a fixed telecommunication network and wishes to charge the last mentioned subscription for the use of another telephone in the network, which does nor belong to this subscription, e.g. a coin box.

A mobile telephone subscriber has normally a subscription also in the wirebound telephone network. If a wirebound telephone is available at the location where the subscriber is located, the subscriber may prefer to use this wirebound telephone instead of his mobile telephone due to the lower cost for the call and the higher speech quality or just to save the batteries of the mobile telephone. For the subscriber it is then desirable to enable the call to be charged to the wirebound subscription.

The procedure in today's existing networks for charging a third terminal, or third party charge, is carried out manually by an operator, involving extra costs and time, which implies that the function has little interest in the described situation.

The manual procedure in Sweden for these Sweden so-called Bt-calls which should be charged to a third party is as follows.

Call an operator on 0018, ask for a Bt-call and state:

the telephone number from which you wish to call, the requested startup time for the call the subscription which should be charged.

The operator calls the number intended for charging to get a confirmation that the charge will be accepted. The operator calls the terminal, from which the call is to be made, at the requested time and following this the called subscriber number can be entered.

SUMMARY

One object of the invention is in general to provide an automatic and simplified service to a subscriber with a radio terminal, which enables the subscriber to request via this terminal a permission to use another terminal or telephone, which does not belong to his radio terminal subscription, and to enable the use to be charged to an account which may be predetermined or specified at said request.

A more specific object of the invention in that connection is to provide a service, which facilitates charging the wirebound subscription of a mobile subscriber if he uses a terminal in this wirebound network, which does not belong to the subscriber.

According to the invention these and other objects, which may appear from the description given below, have been attained by the method and system, defined by way of introduction above, having the features stated in the respective patent claims.

According to the invention the provision of an automatic network service is suggested, to which the radio terminal subscriber can open a subscription while storing information relating to the subscription of the radio terminal of the subscriber, and for the use of which the subscriber via the radio terminal orders the service in question by calling the same and entering the number of the other terminal or telephone, and the subscriber is enabled to communicate from the other terminal, for the use of which charging can be done to an account other than the radio terminal subscription.

One or more accounts may have been stated in advance, e.g. at the start of the subscription of said service, and the account desired to be charged may be entered when ordering the call by entering a short code number on the key pad of the radio terminal, e.g. an extra digit, which has been assigned to the account.

The desired account may, however, alternatively be an account not stated in advance, but which is entered in when requesting the service.

The other terminal may be situated at a distance from the radio terminal when using the service.

In one embodiment a subscription in the additional, automatic service can be made in a wirebound network while storing at the same time information relating to the radio terminal subscription and to a subscription in the wirebound network, belonging to the subscriber, and for the use of said additional service the subscriber via the radio terminal, e.g. a mobile telephone, calls the service by entering the number of another wirebound telephone, e.g. a coin box, included in said wirebound network, which the subscriber wishes to use, whereby the subscriber is assigned a line from said another wirebound telephone, for the use of which the wirebound subscription of the subscriber is automatically charged.

Preferably the subscriber is assigned a personal code at the start of the subscription of the additional service, which code the subscriber must enter via the key pad of the radio terminal or of the other wirebound telephone in connection with the step of requesting use of the service.

If the number of the other terminal or telephone is available in association therewith as a bar code, and the radio terminal has a bar code reader, the service may, according to a particularly preferred embodiment, allow for use of the bar code reader for entering the number of said another terminal, in the step of requesting use of the service.

In accordance with a very advantageous embodiment, and in case said another terminal is nearby the radio terminal, the step of requesting use of said service via said radio terminal may include entering also, on the radio terminal, the number of a further terminal with which said subscriber wishes to communicate from said another terminal, resulting in the subscriber being directly connected by said service for communicating with said further terminal from said another terminal.

According to a further advantageous embodiment said service allows for auxiliary signalling via the radio terminal a message to said service associated with a call in progress in which said radio terminal subscriber participates from said other terminal. Thus, said auxiliary signalling may be directed to said service for requesting connection, without necessitating interruption of the call, of one or more further participants to the call in progress (conference call).

The invention has several advantages.

Thus it allows for a reduction of the telephone bill of mobile subscribers, it provides better speech quality and it saves the battery of the mobile telephone station by allowing available wirebound telephones to be used for outgoing calls. The invention further reduces any overload in the mobile telephone network by increasing the use of the cheaper wirebound network whenever possible.

The invention may be used with all fixed terminals, e.g. telephone terminals. A special case is the use of the invention with a coin box phone, which eliminates the need for paying for the call in cash, by instead charging the subscription owned by the subscriber.

DESCRIPTION OF THE DRAWINGS

A number of embodiments of the invention will now be described more closely, partly with reference to the attached drawings, in which.

DETAILED DESCRIPTION

Figure 1:
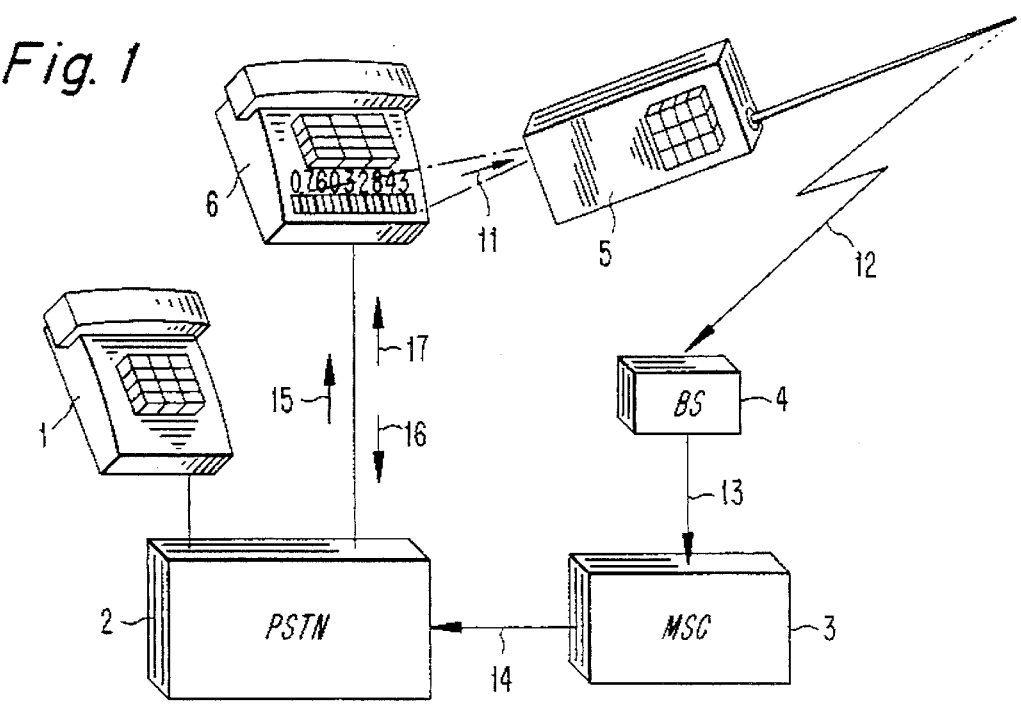
FIG. 1 shows a block diagram illustrating the interaction between a mobile telephone network, a wirebound network and different terminals or parties, which can use these networks.

In the following two specific embodiments of the invention are first described, which are both based upon a situation implying that

- a telephone from which a so-called Bt-call will be ordered is a mobile telephone, which uses data transmission during the set up of the call or a short message service, if available,
- the telephone from which the Bt-call will be made is a telephone in the wirebound network which must be designated when ordering the call,
- the starting time for the Bt-call is immediately (e.g. within 5 minutes) and need therefore not be specifically stated,
- the reservation should preferably be confirmed by making use of a secret code (e.g. 4 digits), known by the subscriber and by the automatic service in question according to the invention,
- the subscription which should be charged is the subscription on the wirebound network of the mobile subscriber, and the corresponding number is known to the service from information which has been stored when subscribing to this service.

According to a first embodiment a bar code reader associated with the mobile telephone is used to designate the telephone from which the Bt-call will be made. This can be done by using the technique for alternating between a mobile telephone and a wirebound telephone, which is per se known from the European patent application No. 92202549.9, which cooresponds to U.S. patent application Ser. No. 07/936,273, assigned and incorporated here by ref. to the same assignee.

As disclosed in the European patent application No. 92202549.9, alternating between a mobile telephone and a wire bound telephone is performed as follows:

1) Point the bar code reader of the mobile telephone set at the bar code label of the permanently wired telephone set while pressing a predetermined key. Wait for acoustic acknowledgement, for example a tone in the mobile telephone set, indicating that the permanently wired telephone set is connected.

2) Lift the handset of the permanently wired telephone set and take the call. The connection to the mobile telephone set will be disconnected by the network system when the handset is picked up. Switch off the mobile station thereafter.

As further disclosed in European Patent Application No. 92202549.9, alternating between a wire bound telephone and a mobile telephone is performed as follows:

1) Switch on the mobile telephone set, point the bar code reader of the mobile telephone set towards the bar code label of the permanently wired telephone set while pressing the same predetermined key as in the opposite change of telephone, as described above.

2) Wait for acoustic acknowledgment, for example a tone in the permanently wired telephone set, that the network system has comprehended the task. Then replace the handset, whereby the call will be forwarded to the mobile station and will continue from there. In short the technique disclosed in European Patent Application No. 9220254 implies that

- the key pad of the mobile terminal and circuits connected thereto for controlling and performing desired functions, in addition to number entering and similar, also allow ordering of alternation of the kind mentioned above, in a telephone network system, in which the wirebound telephone is included and which has functions to allow alternation on request from the mobile terminal,
- a bar code reader is connected to the mobile terminal in such a way that at scanning of a bar coded telephone number, ordering of alternation between the mobile terminal and a telephone with said number is enabled without the need to enter said number with the aid of the key pad,
- close to the wirebound telephone its number is available as a bar code and the alternation is initiated by directing the bar code reader toward this bar code at the same time as a predetermined functional key, selected for the purpose, is being pushed.

More details related to this technique appear in the above mentioned patent application and need therefore not be described more closely here.

When using the present invention one pushes a predetermined key, e.g. 9, on the key pad of the mobile telephone and directs at the same time the bar code reader towards the bar code label of the wirebound telephone, which is desired to be used. The automatic service according to the invention calls the wirebound telephone and when the telephone handset is lifted a voice asks for the secret code. This code is entered on the key pad of the wirebound telephone and if the code is correct a dialing tone is received, because the automatic service has assigned a line. On the key pad of the wirebound telephone the number of the telephone desired to be called can now be entered. After the call is finished the automatic service charges the cost to the wirebound subscription of the mobile subscriber.

If a bar code reader is not available the procedure will, according to the second embodiment, be the following:

On the key pad of the mobile telephone the telephone number of the automatic service according to the invention is entered followed by the number, including area code, of the wirebound telephone, e.g. a coin box, which is desired to be used and this information is transmitted. The automatic service according to the invention calls the wirebound telephone as described above in connection with the use of a bar code reader, and the following steps are the same as in that case.

The embodiments described above will now be explained more in detail with reference to the FIGS. 1 and 2.

FIG. 1 shows a fixed home telephone 1 belonging to a home subscription and connected to a public telephone network 2, also called PSTN (public switched telephone network). A mobile telephone switch 3, also called MSC (mobile services centre) is communicating via a base station 4, also called BS, with a mobile telephone 5. The subscriber of the terminals 1 and 5 desires to use a terminal 6, also belonging to the network 2, and to enable his home subscription to be charged.

The terminal 6 has as an example been shown as a fixed telephone, but the invention is also valid for all kinds of terminals which are connected by wire or by radio to a telecommunication network, e.g. a telefax machine, a personal computer, a mobitex terminal (an Ericsson product), etc.

The other details in FIG. 1 will be described in connection with the flow chart in FIG. 2, the designation numerals of which are in agreement with the numerals of the affected connections in FIG. 1.

Below, step 11 in the flow chart is first explained. When the mobile telephone 5 has been switched on, the subscriber requests via the radio interface to use the terminal 6 for communication, and that the cost for the use are to be charged to his subscription in the fixed network. (It would of course be possible to charge his mobile telephone subscription, but the mobile telephone operator is perhaps less interested in providing this service, which may reduce his revenue while it increases the revenue of the operator of the wirebound telephone network).

Ordering communication via another terminal 6 firstly includes a specification of the service, i.e. third party charge, secondly an identification of the terminal 6, i.e. the terminal number and the network it belongs to. The terminal 6 can be in the immediate neighborhood of the subscriber or be located in another place. The step 11 can be carried out by eye reading and entering the telephone number of the terminal 6 on the mobile telephone. Alternatively scanning by a bar code reader associated with the mobile telephone may be done as has been described above, but it is also possible to remember the number of a terminal 6 at another location and enter it on the mobile telephone.

According to step 12 in the flow chart the call ordering is transmitted to a base station 4 in the mobile telephone network, from which it continues to the MSC 3 via the connection 13 and to the PSTN 2 via the connection 14. The connection between the PSTN 2 and the home telephone 1 does not take part in the process and has thus no designation number.

Step 15 in the flow chart indicates how the PSTN 2 asks for the subscriber PIN-code. This may imply that the PSTN 2 calls the terminal 6, the subscriber lifts the handset and hears a voice record requesting a PIN. Another possibility, especially when the terminal 6 is remotely located from the subscriber, is that the PSTN 2 asks for a PIN via the mobile telephone 5 through a suitable voice instruction.

Step 16 indicates that the subscriber enters the PIN via the key pad of the terminal 6, but this can alternatively be done via the mobile telephone key pad, in which case it is transferred to PSTN 2 via the connections 12, 13 and 14. The selection of an account is described in detail below in step 18.

According to step 17 the PSTN 2 assigns, after successful indentification of the subscriber, a line to the terminal 6, which is manifested by a register tone in the handset of said terminal. Now the subscriber can set up the desired call to the B-subscriber he wishes to communicate with by entering the B-number on the handset belonging to the terminal 6. If the terminal 6 is remotely located or there are other reasons, the PSTN 2 can alternatively be informed of the number of the B-subscriber via the key pad of the mobile terminal 5. An example of such a use is when the subscriber wants to instruct a data base to fax information stored therein to a fax terminal at a customer.

Step 18 indicates that the PSTN charges the connection to the home subscription of the subscriber. It should also be possible in step 18 to charge one of several possible accounts, e.g. one account for a private call and another account for a company call. If there are several accounts the selection should be done by entering an extra digit in step 16 in connection with entering the PIN.

Figure 2:
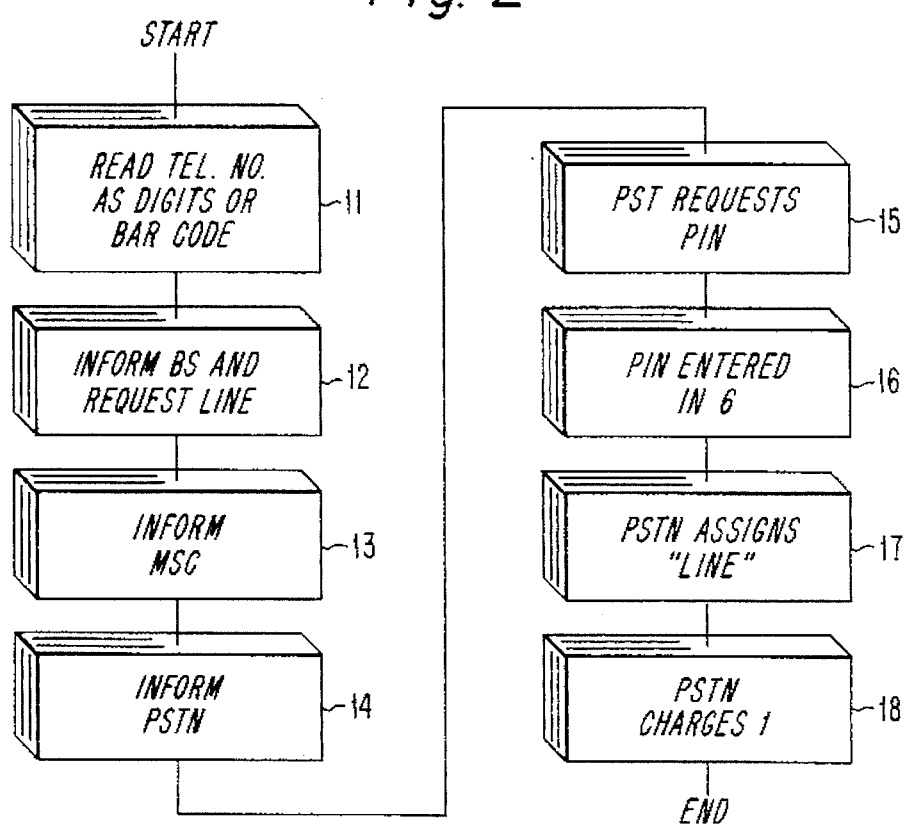
FIG. 2 shows a flow chart in connection with FIG. 1, FIGS. 3 and 4 are a block diagram and a flow chart, respectively, similar to those of FIGS. 1 and 2, respectively, to illustrate a further embodiment.

Above, in connection with describing step 17 in FIG. 2, it was mentioned that, alternatively to the mobile subscriber entering the number of the B-subscriber on the handset belonging to the terminal 6, he could inform the PSTN 2 of the number of the B-subscriber via the key pad of the mobile terminal 5. A further embodiment directed to this alternative will now be described with reference to FIGS. 3 and 4.

Figure 3:
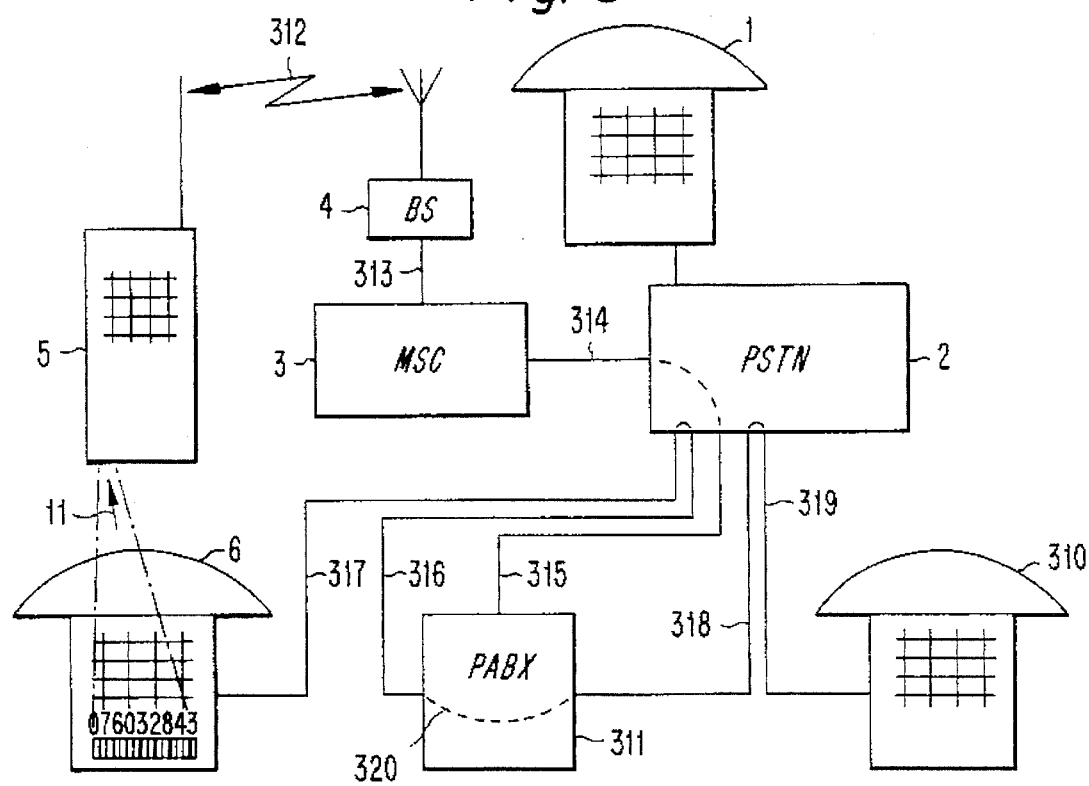

FIG. 3 is an extension of the block diagram of FIG. 1. The new elements in the block diagram are a service node 311, here implemented as a PABX, terminal 310 of a called subscriber and connections 315–320 between the units 2, 6, 310 and 311 as shown. This embodiment gives an example of a case where the mobile radio terminal is used for all information exchange between the calling subscriber and the network. By avoiding use of the keypad of the "borrowed" terminal 6 it may be easier for the "owner" of this terminal to believe that he will not be charged for the call.

In FIG. 3 a call is ordered to be set up between the terminals 6 and 310 by transmitting this order with the necessary information from the mobile telephone terminal 5 to the PABX 311. The PABX 311 sets up a first call to terminal 6 and a second call to terminal 310 and interconnects these calls. The PABX charges a specified account for the two calls.

It should be noted that the connection between terminals 6 and 310 may be set up according to more complicated schemes as described in the PCT-patent application No. SE 93/00074 which corresponds to U.S. patent application Ser. No. 08/018,214, assigned to the present assignee. As disclosed in PCT Patent Application No. SE 93/00074 the PABX receiving the order to set up the calls may designate another node (PABX) from which the two calls will be set up, thereby minimizing the length and cost of the total connection. To designate another node for setting up the calls, the PABX assigns the selection of a route between terminal 6 and terminal 310 to the new PABX node. Connection routes are established from terminal 6 to the new PABX node and from terminal 310 to the new PABX node. Finally, connections between terminals 6 and 310 and the new PABX node are coupled together internally within the new PABX node.

Figure 4:
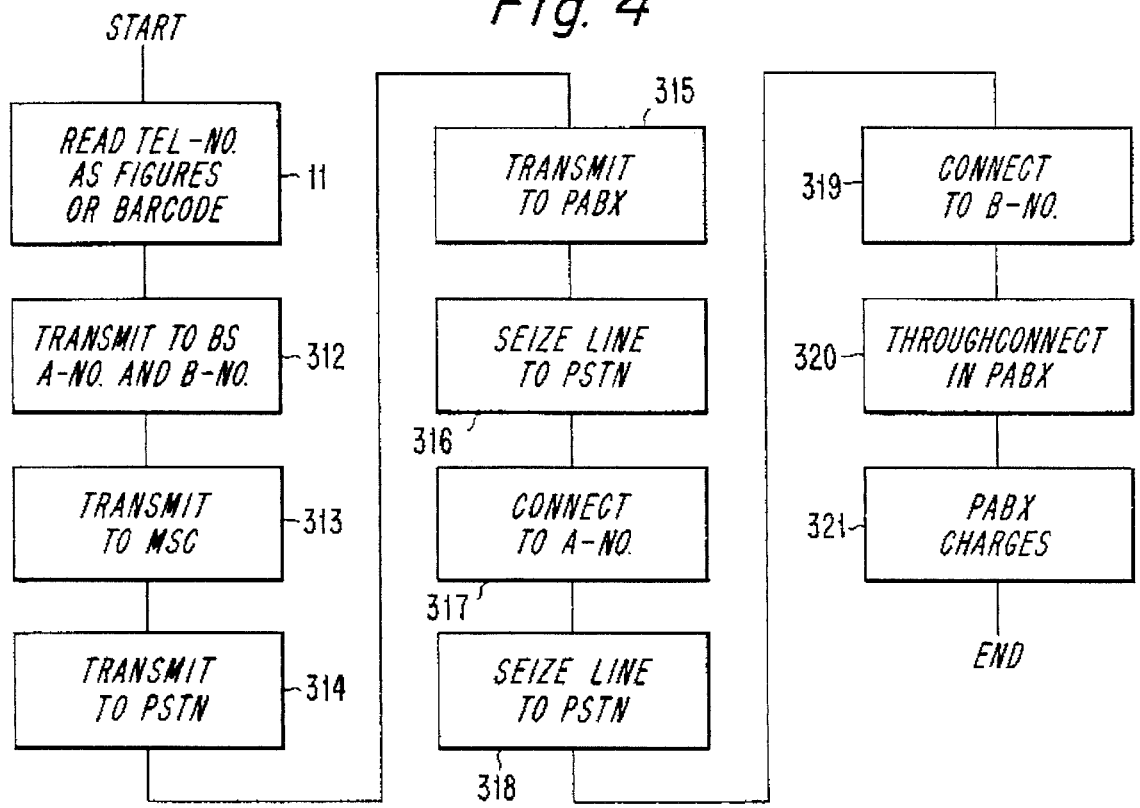

Reference is now made to FIG. 4. In step 11 the user switches the mobile radio terminal 5 on and specifies "third party charge service" by entering a special code on the keypad of 5, including or referring to the telephone number of the PABX 311.

In step 312 the user then enters the A- and B-numbers, i.e. the telephone numbers of the terminals 6 and 310, into the mobile terminal 5, either via the keypad of 5 or by using a barcode reader for the A-number and the keypad for the B-number. The user enters also a personal identification number (PIN) if the procedure so requires. Then the user calls the PABX 311 by pressing the "send" key on the mobile radio terminal 5.

The above described information is communicated to the PABX 311 via the base station BS, according to step 312, the mobile services centre 3 via the connection 313 in step 313, the PSTN 2 via the connection 314 in step 314 and finally to the PABX 311 via the connection 315 in step 315.

Then, when the PABX has performed authentication and checked the PIN according to known procedures it will set up the requested connection. A line to the PSTN is seized in step 316 and a connection to the terminal 6 is set up in step 317 using known procedures. Also a connection to the terminal 310 is set up in steps 318 and 319. Alert signals are sent to both terminals 6 and 310. When both sides have gone off-hook the PABX 311 through-connects the two sides by the link 320 in step 320. At last, in step 321, the PABX charges a previously designated account for the two partial calls described.

Figure 5:
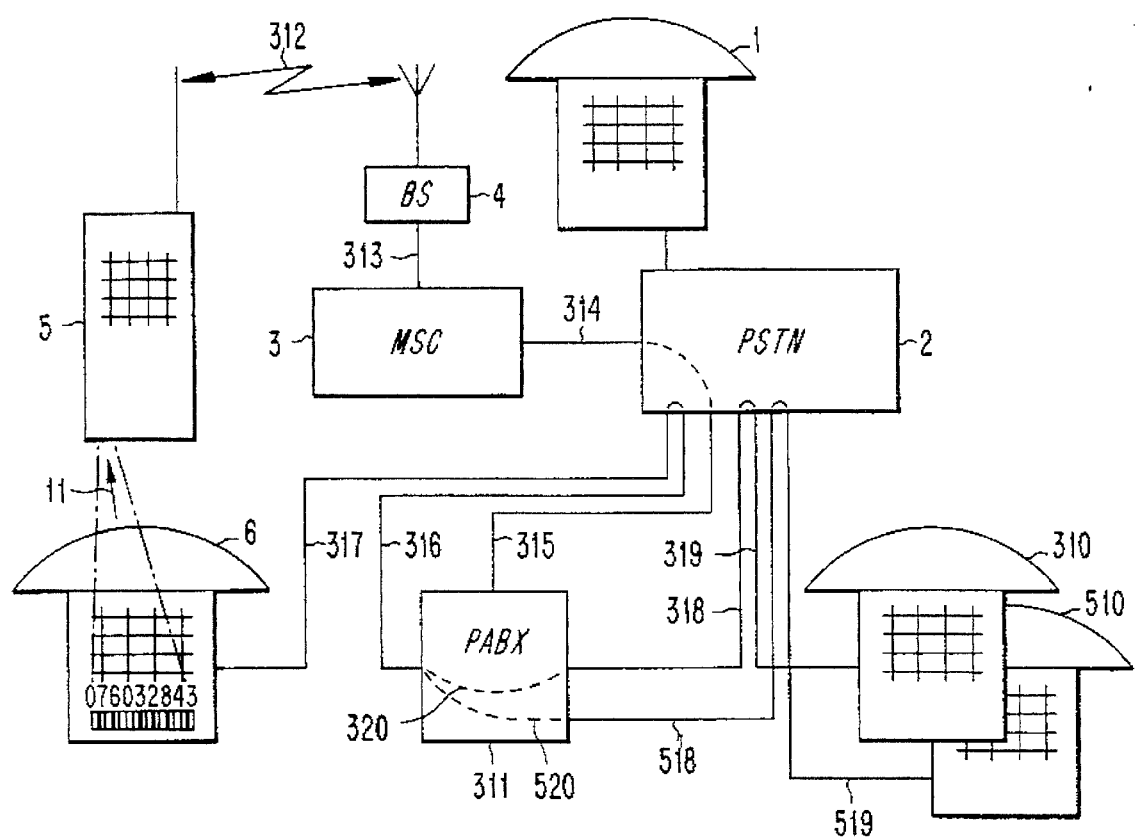
FIGS. 5 and 6 are a similar block diagram and flow chart, respectively, that illustrate a further embodiment.
Figure 6:
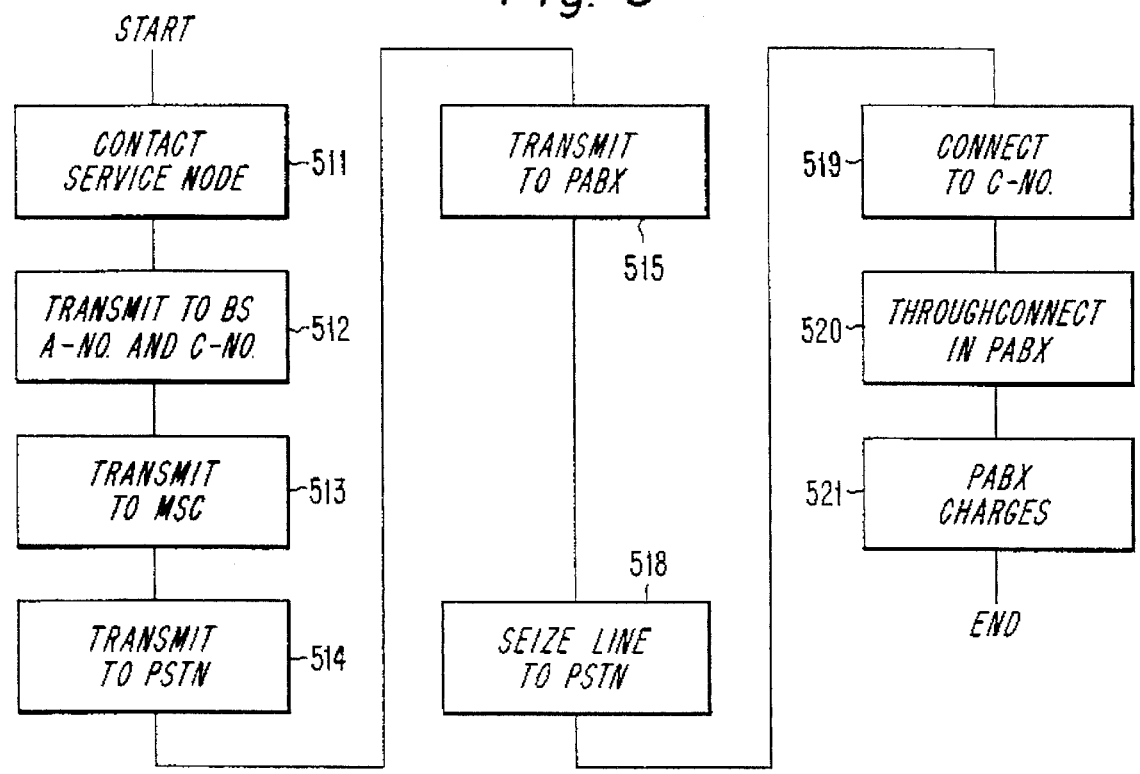

FIGS. 5 and 6 illustrate a further embodiment teaching how to set up a third (and further) participant in a conference call when two participants are already communicating. Conventionally this problem is solved by one of the two participants pushing the-R key or the on-hook contact (commonly referred to as "flashing") to enable signalling, thereby interrupting the communication in progress thus far.

FIG. 5 differs from FIG. 3 only by the introduction of a third terminal 510 intended to take part in a conference call with the other two terminals 6, 310 and associated connections 518–520.

FIG. 6 illustrates steps 512–515 and 518–521 which generally correspond to steps 312–315 and 318–321, respectively, in FIG. 4. The following differences exist:

In step 511 the service node is contacted indicating conference call with at least a third terminal 510. In step 512 the telephone numbers transferred are the A-number or the B-number, to indicate the communication in progress, and at least one C-number. According to step 519 the connection to the C-number is carried out. Remaining steps are self explanatory as they are the same as for terminal 310.

The advantage of this embodiment is that the proceeding communication can continue while the signalling to add another participant to the communication is performed from a different radio terminal over a different channel. Similarly any signalling can be performed via the radio terminal during a call in progress, said signalling being associated somehow with this call. An example of such signalling, with further reference to the conference call case, could be instructing the network how to handle a second call incoming during a first ongoing call, possibly diverting the second call to a secretary or to the voice mail box or telling the caller to wait for one minute.

To enable the services described above with reference to FIGS. 1–6, there are storing possibilities and devices in a data base, not shown, and belonging to the network 2, by means of which subscriber data are stored and the respective tasks are controlled. Those skilled in the art know how to carry this out in practice, and a more detailed description is therefor not required here.

We claim:

1. A method for enabling a calling subscriber with a radio terminal capable of communication with a radio network to use another terminal, which does not belong to his radio terminal subscription but is capable of communication with another network, comprising the steps of:

providing an automatic network service for said calling subscriber in at least one of the networks, filing information concerning said radio terminal subscription in at least one of the networks, requesting use of said service by the calling subscriber's calling said service via said radio terminal, entering by the calling subscriber a number of said another terminal and a number of a terminal said calling subscriber wishes to call, wherein said service sets up a connection to said another terminal and a connection to the terminal said calling subscriber wishes to call, and interconnects these connections, resulting in the calling subscriber being able to initiate a call from said another terminal, and charging use of said automatic network service to a specified account, wherein the specified account is one of a group of several accounts, and the group includes the subscription of said another terminal.

2. A method according to claim 1, wherein the charging step comprises the step of the calling subscriber's entering said account before requesting use of said service.

3. A method according to claim 1, wherein the charging step comprises the step of the calling subscriber's entering several accounts in advance and identifying a particular one of the several accounts desired to be charged after use of said service by entering a code number assigned to said particular one of the several accounts.

4. A method according to claim 1, wherein the charging step comprises the step of the calling subscriber's informing said automatic network service of said specified account when use of said service is requested.

5. A method according to claim 1, wherein said another terminal is located apart from said radio terminal when use of said service is requested.

6. A method according to claim 1, wherein, when said another terminal is proximate to the radio terminal, the requesting step includes the step of the calling subscriber's entering, on the radio terminal, a number of a further terminal with which said calling subscriber wishes to communicate from said another terminal, and further comprising the step of directly connecting the calling subscriber via said service for communicating with said further terminal from said another terminal.

7. A method according to claim 1, further comprising the step of auxiliary signalling, via the radio terminal, a message to said service, said message being associated with a call in progress and said calling subscriber participating from said another terminal in said call in progress.

8. A method according to claim 7, wherein said auxiliary signalling message requests connection, without necessitating interruption of the call in progress, of at least one further participant to the call in progress.

9. A method according to claim 1, wherein said providing step includes the step of enabling said calling subscriber to open a subscription on said service in a wirebound network while storing information concerning the radio terminal subscription and a wirebound subscription belonging to the calling subscriber in said network, use of said service is requested from said radio terminal while the calling subscriber enters the number of a fixed telephone which does not belong to the calling subscriber's wirebound subscription, and which the calling subscriber desires to use, and the use of said service is charged to the calling subscriber's wirebound subscription.

10. A method according to claim 1, further comprising the step of the calling subscriber's entering a personal code (PIN) assigned to the calling subscriber for requesting said service.

11. A method according to claim 1, further comprising the step of using, when the number of said another terminal is provided in association therewith as a bar code, a bar code reader associated with said radio terminal for entering the number of said another terminal, in the step of requesting use of the service.

12. A system for enabling a calling subscriber with a radio terminal capable of connection to a radio communication network to use another terminal, which does not belong to his radio terminal subscription but is capable of connection to another communication network comprising:

an automatic network service in at least one of the radio and another communication networks, means for storing information concerning said radio terminal subscription in at least one of said radio and another communication networks, means for requesting use of said automatic network service by the calling subscriber's calling it via said radio terminal, and means for the calling subscriber's entering a number of said another terminal and a number of a terminal the subscriber wishes to call, wherein said service sets up a connection to said another terminal and a connection to the terminal said calling subscriber wishes to call, and interconnects these connections, resulting in the calling subscriber being able to initiate a call from said another terminal, and to be charged for the use of said automatic network service to a specified account which is one of a group of several accounts, and the group includes the subscription of said another terminal.

13. A system according to claim 12, including means for the calling subscriber's entering said account before requesting use of said automatic network service.

14. A system according to claim 12, wherein the entering means enables the calling subscriber's entering several accounts in advance and entering a particular one of the several accounts, desired to be charged after use of said service, by entering a code number assigned to said particular account.

15. A system according to claim 12, wherein the entering means enables the calling subscriber's informing said service of said specified account when use of said service is requested.

16. A system according to claim 12, wherein said another terminal is located apart from said radio terminal when the calling subscriber requests use of said service.

17. A system according to claim 12, wherein the entering means enables the calling subscriber's entering a number of a further terminal with which said calling subscriber wishes to communicate from said another terminal, resulting in the calling subscriber being directly connected by said service for communicating with said further terminal from said another terminal.

18. A system according to claim 12, further comprising means for auxiliary signalling, via the radio terminal, a message to said service associated with a call in progress, wherein said calling subscriber participates in said call in progress from said another terminal.

19. A system according to claim 18, wherein said auxiliary signalling message is directed to said service for requesting connection, without necessitating interruption of the call, of at least one further participant to the call in progress.

20. A system according to claim 12, wherein said service includes means for enabling said calling subscriber to open a subscription on said service in a wirebound network while storing information therein concerning the radio terminal subscription and a wirebound subscription belonging to the subscriber in said network, and said requesting means requests use of said service from said radio terminal while entering the number of a fixed telephone which does not belong to the calling subscriber's wirebound subscription, and which the calling subscriber desired to use, and charging to said wirebound subscription the use of said fixed telephone.

21. A system according to claim 12, wherein said calling subscriber enters an assigned personal code (PIN) in requesting said service.

22. A system according to claim 12, further comprising, when the number of said another terminal is provided in association therewith as a bar code, a bar code reader associated with said radio terminal for entering the number of said another terminal.

* * * * *